United States Patent
Iwama (10) Patent No.: US 11,603,083 B2
(45) Date of Patent: Mar. 14, 2023

(54) BRAKING CAPACITY DECREASE DETERMINING DEVICE

(71) Applicant: Toyota Jidosha Kabushiki Kaisha, Toyota (JP)

(72) Inventor: Masamichi Iwama, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 17/075,958

(22) Filed: Oct. 21, 2020

(65) Prior Publication Data
US 2021/0188234 A1 Jun. 24, 2021

(30) Foreign Application Priority Data
Dec. 20, 2019 (JP) .............................. JP2019-230068

(51) Int. Cl.
*B60T 13/66* (2006.01)
*B60T 7/04* (2006.01)
(Continued)

(52) U.S. Cl.
CPC .......... *B60T 13/662* (2013.01); *B60T 7/042* (2013.01); *B60L 15/2009* (2013.01);
(Continued)

(58) Field of Classification Search
CPC ...... B60T 13/662; B60T 13/686; B60T 7/042; B60T 8/176; B60T 8/1761;
(Continued)

(56) References Cited

U.S. PATENT DOCUMENTS

| 7,938,493 B2* | 5/2011 | Miyazaki | B60T 8/442 303/11 |
| 8,239,112 B2* | 8/2012 | Joyce | B60T 8/172 188/293 |

(Continued)

FOREIGN PATENT DOCUMENTS

| CN | 10332890 A | 9/2013 |
| JP | 2001-206218 A | 7/2001 |

(Continued)

*Primary Examiner* — Pamela Rodriguez
(74) *Attorney, Agent, or Firm* — Dinsmore & Shohl LLP (57) ABSTRACT

A braking capacity decrease determining device including a brake ECU is applied to a vehicle including wheel speed sensors and a brake device. The brake ECU performs a first determination process of determining whether a temporary braking decrease determination condition is satisfied for each of a plurality of wheels provided on the vehicle. The brake ECU additionally performs a second determination process of determining whether there are both a wheel for which the temporary braking decrease determination condition is satisfied and a wheel for which the temporary braking decrease determination condition is not satisfied out of the plurality of wheels and determining that a braking capacity of the brake device has decreased when it is determined that there are both a wheel for which the temporary braking decrease determination condition is satisfied and a wheel for which the temporary braking decrease determination condition is not satisfied.

4 Claims, 5 Drawing Sheets

(51) Int. Cl.
*B60L 15/20* (2006.01)
*B60T 13/68* (2006.01)

(52) U.S. Cl.
CPC ......... *B60L 2240/12* (2013.01); *B60T 13/686* (2013.01); *B60T 2270/604* (2013.01)

(58) Field of Classification Search
CPC ............. B60T 8/17616; B60T 15/2009; B60T 2240/12; B60T 2270/604
See application file for complete search history.

(56) References Cited

U.S. PATENT DOCUMENTS

| | | | |
|---|---|---|---|
| 9,008,901 B2* | 4/2015 | Udaka | B60T 17/221 303/177 |
| 2007/0216222 A1* | 9/2007 | Miyazaki | B60T 8/172 303/177 |

FOREIGN PATENT DOCUMENTS

| | | |
|---|---|---|
| JP | 2007-182180 A | 7/2007 |
| JP | 2009-190475 A | 8/2009 |
| JP | 2012-153201 A | 8/2012 |
| WO | 2009101499 A1 | 8/2009 |
| WO | 2012101497 A1 | 8/2012 |

* cited by examiner

BRAKING CAPACITY DECREASE DETERMINING DEVICE

CROSS-REFERENCE TO RELATED APPLICATION

This application claims priority to Japanese Patent Application No. 2019-230068 filed on Dec. 20, 2019, incorporated herein by reference in its entirety.

BACKGROUND

1. Technical Field

The disclosure relates to a braking capacity decrease determining device that can determine whether a braking capacity of a vehicle brake device decreases.

2. Description of Related Art

A fade warning device in the related art (hereinafter referred to as a "device in the related art") performs braking such that a vehicle decelerates at a target deceleration based on a braking request from a driver, and determines that a fade determination condition is satisfied when the magnitude of an actual deceleration is less than the magnitude of a target deceleration and a difference therebetween is equal to or greater than a predetermined value. The device in the related art determines that brake fade (also referred to as a "fading state") occurs when the fade determination condition is satisfied. The fading state is a state in which a frictional member for a brake is overheated and the brake does not work well (that is, a state in which a braking capacity of the vehicle brake device decreases). Accordingly, the device in the related art can be said to determine whether a braking capacity of a vehicle brake device decreases (see Japanese Unexamined Patent Application Publication No. 2001-206218 (JP 2001-206218 A)).

SUMMARY

The fade determination condition which is employed by the device in the related art is not a condition which is satisfied only when the braking capacity of the vehicle brake device decreases. For example, when a braking capacity of a vehicle brake device has not decreased and the vehicle is traveling on a road surface with a relatively low road surface friction coefficient μ (hereinafter also referred to as a "low μ road"), the magnitude of an actual deceleration may be less likely to increase and thus a difference between a target deceleration and an actual deceleration may be equal to or greater than a predetermined value.

Accordingly, the device in the related art may erroneously determine that a fading state has occurred (that is, the braking capacity has decreased) when the braking capacity of the vehicle brake device has not decreased and the fade determination condition is satisfied. Accordingly, there is a likelihood that accuracy for the device in the related art to determine whether the braking capacity of the vehicle brake device has decreased will be lowered.

The disclosure provides a braking capacity decrease determining device that can improve accuracy for determining whether a braking capacity of a vehicle brake device has decreased. In the following description, the braking capacity decrease determining device according to the disclosure may be referred to as a "determination device according to the disclosure."

A determination device according to the disclosure is applied to a vehicle including: wheel speed sensors configured to generate signals corresponding to wheel speeds (VwFL, VwFR, VwRL, VwRR) of a plurality of wheels (WFL, WFR, WRL, WRR) provided in the vehicle; a brake device (BA) including frictional brake devices (20FL, 20FR, 20RL, 20RR) that are provided in the plurality of wheels and that are able to adjust a frictional braking force which is applied to the corresponding wheel; and a control unit (10) configured to control the frictional braking forces which are applied to the plurality of wheels.

The control unit of the determination device according to the disclosure may be configured to perform a first determination process of determining whether a temporary braking decrease determination condition is satisfied for each of a plurality of wheels, the temporary braking decrease determination condition being satisfied when a first condition which is satisfied at the time of strong braking in which a magnitude of a required deceleration for the vehicle is equal to or greater than a predetermined deceleration threshold value and a second condition which is satisfied when a slip index value (SPi, Smi) indicating a degree of slip of each wheel which is calculated based on the wheel speeds of the plurality of wheels is equal to or less than a predetermined slip threshold value (SPth, Smith) are satisfied (Step 215, Step 305, and Step 505). The first condition may be determined using a required deceleration which is calculated based on a required brake operation amount such as a master cylinder pressure and a brake pedal operation amount or may be determined based on a required brake operation amount.

In addition, the control unit may be configured to perform a second determination process of determining whether there are both a wheel for which the temporary braking decrease determination condition is satisfied and a wheel for which the temporary braking decrease determination condition is not satisfied out of the plurality of wheels and determining that a braking capacity of the brake device has decreased when it is determined that there are both a wheel for which the temporary braking decrease determination condition is satisfied and a wheel for which the temporary braking decrease determination condition is not satisfied (Step 225, determination of "YES" in Step 225, Step 230, and Step 235).

With the determination device according to the disclosure, whether there is a likelihood that a braking capacity has decreased is determined for each of the frictional brake devices provided in the wheels through the first determination process. In addition, whether there are both a wheel for which the temporary braking decrease determination condition is satisfied and a wheel for which the temporary braking decrease determination condition is not satisfied is determined through the second determination process. When there are both wheels, the likelihood that the braking capacity of the frictional brake device has decreased is considerably high and thus the determination device according to the disclosure determines that the braking capacity of the frictional brake device has decreased.

When there is a wheel Wa for which the temporary braking decrease determination condition is not satisfied, it can be determined that a wheel frictional braking force which is much greater than a road surface friction coefficient μ of a road surface on which the vehicle is traveling is acting on the wheel Wa. In this situation, when there is a wheel Wb for which the temporary braking decrease determination condition is satisfied, it can be considered that the frictional braking force for the wheel Wb is less than the frictional braking force for the wheel Wa. Accordingly, the determination device according to the disclosure can improve accuracy for determining whether the braking capacity of the vehicle brake device has decreased.

In one aspect of the determination device according to the disclosure, the control unit may be configured to perform antilock brake control for decreasing the frictional brake force which is applied to an ABS object wheel which is a wheel in which the slip index value is greater than a predetermined antilock control start threshold value when there is the ABS object wheel. The control unit may be configured to determine that the second condition is satisfied when a condition which is satisfied when the corresponding wheel is not the ABS object wheel is further satisfied in the first determination process (Step 305).

When there are a wheel which is an ABS object wheel and a wheel which is not an ABS object wheel, it is considered that a frictional braking force which is much greater than the road surface friction coefficient $\mu$ of the road surface on which the vehicle is traveling is acting on the wheel which is an ABS object wheel and sufficient frictional braking force is not acting on the wheel which is not an ABS object wheel. Accordingly, according to the aspect, since accuracy of determining a temporary braking decrease determination condition can be enhanced, it is possible to enhance accuracy for determining whether the braking capacity of the vehicle control device has decreased.

In one aspect of the determination device according to the disclosure, when the brake device brakes the vehicle, the control unit may be configured to calculate a first estimated value ($\mu1$) of a road surface friction coefficient of a road surface on which the vehicle is traveling and a second estimated value ($\mu2$) of the road surface friction coefficient of the road surface for each of the plurality of wheels and to determine the lesser value of the first estimated value and the second estimated value as an estimated road surface friction coefficient ($\mu0$) which is a final estimated value of the road surface friction coefficient of the road surface. The control unit may be configured to slowly increase the frictional braking force of the ABS object wheel after decreasing the frictional braking force of the ABS object wheel by a predetermined amount in the antilock brake control. The control unit may be configured to calculate the first estimated value for the wheel through a process of: setting the first estimated value for the wheel to a predetermined upper limit value from a time point at which the brake device starts braking the vehicle to a time point at which the antilock brake control is started; calculating the first estimated value for the wheel based on a braking force which is generated by the wheel against the road surface at a time point immediately before a time point at which the frictional braking force has decreased when the frictional braking force for the wheel decreases by the antilock brake control; increasing the first estimated value for the wheel at a first rate of increase which is constant while the frictional braking force of the wheel is increasing by the antilock brake control; and setting the first estimated value for the wheel to the upper limit value when the first estimated value for the wheel is greater than the upper limit value. The control unit may be configured to calculate the second estimated value for the wheel through a process of: calculating a value increasing at a second rate of increase which is constant from a predetermined initial value which is a value less than the upper limit value as the second estimated value for the wheel after a time point at which braking the vehicle has been started; and setting the second estimated value for the wheel to the upper limit value when the second estimated value for the wheel is greater than the upper limit value. In the first determination process, the control unit may be configured to determine whether a third condition which is satisfied when the determined estimated road surface frictional coefficient matches the upper limit value is satisfied and to determine that the temporary braking decrease determination condition for the wheel for which the first condition, the second condition, and the third condition are all satisfied is satisfied when the first condition, the second condition, and the third condition are all satisfied (Step 505, Step 220, determination of "YES" in Step 225, Step 230, and Step 235).

When the braking capacity of the frictional brake device does not decrease, antilock brake control is started by strong braking and the frictional braking force decreases, and thus the first estimated value is less than the upper limit value. On the other hand, the second estimated value reaches the predetermined upper limit value. Accordingly, the value of the estimated road surface friction coefficient is the first estimated value which is less than the upper limit value. On the other hand, when the braking capacity of the frictional brake device decreases, the antilock brake control is not started, and thus the frictional braking force does not decrease, both of the first estimated value and the second estimated value reach the upper limit value, and thus the estimated road surface friction coefficient matches the upper limit value. Accordingly, when the estimated road surface friction coefficient matches the upper limit value (that is, when the third condition is satisfied), it can be considered that there is a likelihood that the braking capacity of the frictional brake device of the wheel in which the estimated road surface friction coefficient matches the upper limited value has decreased.

Therefore, in the aspect, the condition (the third condition) that the estimated road surface friction coefficient matches the upper limit value is included in the temporary braking decrease determination condition. Accordingly, the device according to the aspect can further enhance accuracy for determining whether the braking capacity of the vehicle brake device has decreased.

In one aspect of the determination device according to the disclosure, the control unit may be configured to estimate a temperature of a member (23FL, 23FR, 23RL, 23RR) constituting the frictional brake device provided in each of the plurality of wheels. In the first determination process, the control unit may be configured to determine whether a fourth condition which is satisfied when the estimated temperature of the member constituting the frictional brake device provided in each wheel is equal to or greater than a predetermined temperature threshold value is satisfied and to determine that the temporary braking decrease determination condition for the wheel for which the first condition, the second condition, and the fourth condition are all satisfied is satisfied when the first condition, the second condition, and the fourth condition are all satisfied.

When a temperature of a member (for example, a brake pad) constituting the frictional brake device is equal to or greater than a predetermined temperature threshold value, there is a likelihood that the braking capacity of the frictional brake device has decreased due to a fade. Therefore, in the aspect, the fourth condition which is satisfied when the estimated temperature of the member is equal to or greater than the predetermined temperature threshold value is included in the temporary braking decrease determination condition. Accordingly, the device according to the aspect can further enhance accuracy for determining whether the braking capacity of the vehicle brake device has decreased.

In the above description, names and/or reference signs used in embodiments which will be described later are provided in parentheses for elements of the disclosure corresponding to those in the embodiments in order to help with understanding of the disclosure. However, the elements of the disclosure are not limited to the embodiments defined by the names and/or the reference signs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuration

A vehicle control device according to a first embodiment of the disclosure (hereinafter referred to as a "first control device") is mounted in a vehicle which is not illustrated. The vehicle control device has a function of determining whether a braking capacity of a vehicle control device BA has decreased and thus is also referred to as a "braking capacity decrease determining device or determination device." In this embodiment, the vehicle is a vehicle including an internal combustion engine as a drive source. The vehicle may be an electric vehicle or may be a hybrid vehicle.

Figure 1:
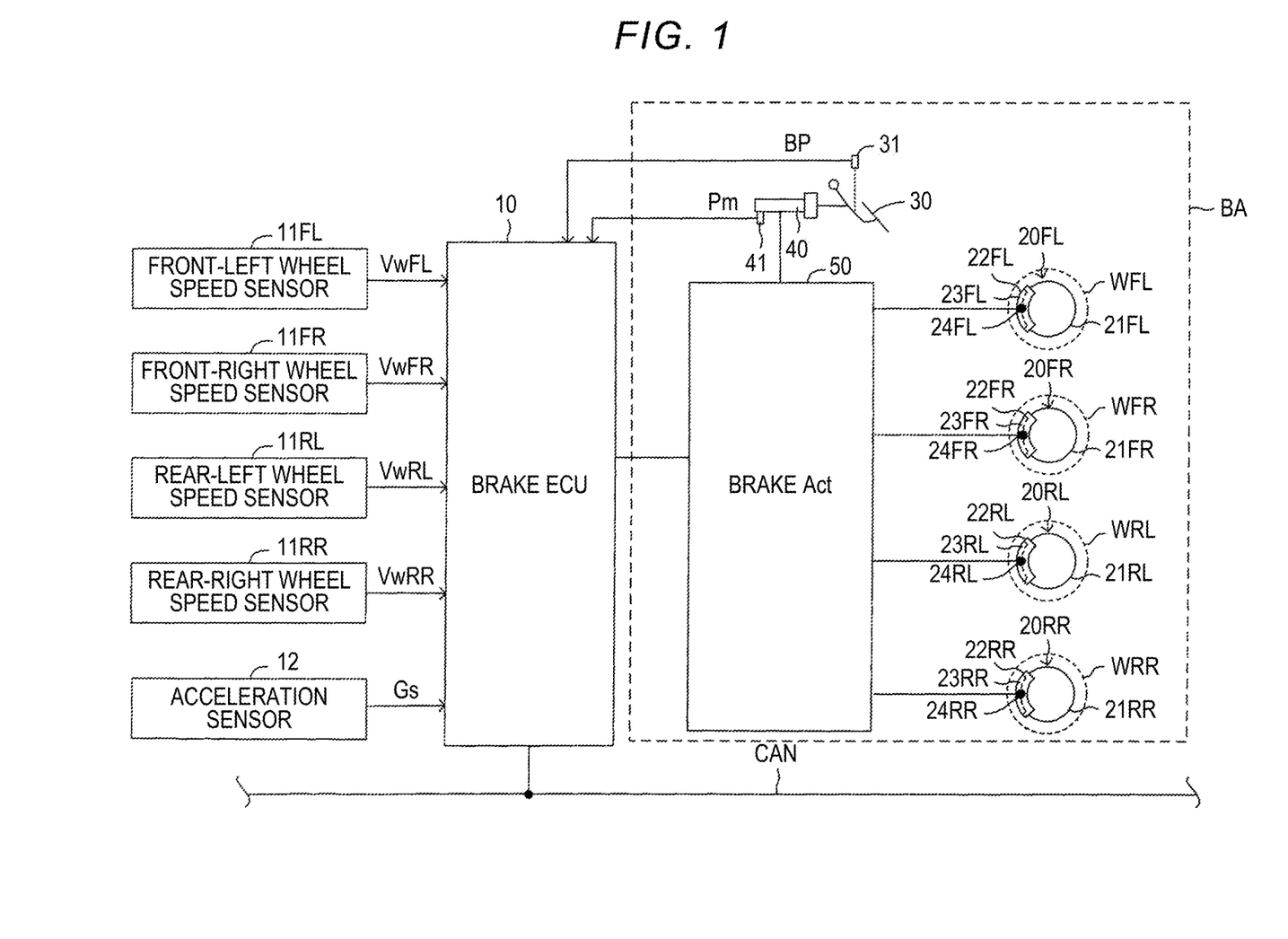
FIG. 1 is a diagram schematically illustrating a configuration of a vehicle control device (a first control device) according to a first embodiment of the disclosure.

As illustrated in FIG. 1, the first control device includes a brake ECU 10 and another ECU which is not illustrated.

The ECUs are connected to each other via a controller area network (CAN) in a data exchangeable (communicative) manner. Each ECU includes a microcomputer. The microcomputer includes a CPU, a ROM, a RAM, and an interface (I/F). The CPU realizes various functions by executing instructions (such as programs or routines) which are stored in the ROM.

A front-left wheel speed sensor 11FL, a front-right wheel speed sensor 11FR, a rear-left wheel speed sensor 11RL, a rear-right wheel speed sensor 11RR, and an acceleration sensor 12 are connected to the brake ECU 10. The brake ECU 10 receives signals (pulses) which are generated by the sensors.

The front-left wheel speed sensor 11FL generates a signal corresponding to a wheel speed of a front-left wheel WFL (hereinafter referred to as a "front-left wheel speed VwFL") of the vehicle. The front-right wheel speed sensor 11FR generates a signal corresponding to a wheel speed of a front-right wheel WFR (hereinafter referred to as a "front-right wheel speed VwFR") of the vehicle. The rear-left wheel speed sensor 11RL generates a signal corresponding to a wheel speed of a rear-left wheel WRL (hereinafter referred to as a "rear-left wheel speed VwRL") of the vehicle. The rear-right wheel speed sensor 11RR generates a signal corresponding to a wheel speed of a rear-right wheel WRR (hereinafter referred to as a "rear-right wheel speed VwRR") of the vehicle.

In the following description, the front-left wheel speed sensor 11FL, the front-right wheel speed sensor 11FR, the rear-left wheel speed sensor 11RL, and the rear-right wheel speed sensor 11RR are generically referred to as a "wheel speed sensor 11" when they do not need to be distinguished. The front-left wheel WFL, the front-right wheel WFR, the rear-left wheel WRL, and the rear-right wheel WRR are generically referred to as a "wheel Wi" when they do not need to be distinguished. The front-left wheel speed VwFL, the front-right wheel speed VwFR, the rear-left wheel speed VwRL, and the rear-right wheel speed VwRR are generically referred to as a "wheel speed Vwi" when they do not need to be distinguished.

More specifically, the wheel speed sensor 11 generates one pulse signal whenever the corresponding wheel Wi rotates at a predetermined angle. The brake ECU 10 counts the number of pulse signals from the wheel speed sensor 11 which are received in a predetermined time and acquires the wheel speed Vwi of the wheel Wi based on the counting result. The wheel speed sensor 11 may output a signal indicating the wheel speed Vwi of the corresponding wheel Wi to the brake ECU 10.

The acceleration sensor 12 detects acceleration in a longitudinal direction of the vehicle and generates a signal indicating the detected acceleration Gs. When the acceleration Gs has a negative value, the magnitude (absolute value) of the acceleration Gs indicates deceleration.

A vehicle brake device BA is further connected to the brake ECU 10. The vehicle brake device BA includes frictional brake devices 20FL, 20FR, 20RL, and 20RR. The vehicle brake device BA further includes a brake pedal 30, a master cylinder 40, and a brake actuator 50.

The frictional brake device 20FL includes a brake disc 21FL, a brake caliper 22FL, a brake pad 23FL, and a wheel cylinder 24FL incorporated in the brake caliper 22FL. The frictional brake device 20FR includes a brake disc 21FR, a brake caliper 22FR, a brake pad 23FR, and a wheel cylinder 24FR incorporated in the brake caliper 22FR. The frictional brake device 20RL includes a brake disc 21RL, a brake caliper 22RL, a brake pad 23RL, and a wheel cylinder 24RL incorporated in the brake caliper 22RL. The frictional brake device 20RR includes a brake disc 21RR, a brake caliper 22RR, a brake pad 23RR, and a wheel cylinder 24RR incorporated in the brake caliper 22RR.

The frictional brake devices 20FL, 20FR, 20RL, and 20RR are generically referred to as a "frictional brake device 20" when they do not need to be distinguished. The brake discs 21FL, 21FR, 21RL, and 21RR are generically referred to as a "brake disc 21" when they do not need to be distinguished. The brake calipers 22FL, 22FR, 22RL, and 22RR are generically referred to as a "brake caliper 22" when they do not need to be distinguished. The brake pads 23FL, 23FR, 23RL, and 23RR are generically referred to as a "brake pad 23" when they do not need to be distinguished. The wheel cylinders 24FL, 24FR, 24RL, and 24RR are generically referred to as a "wheel cylinder 24" when they do not need to be distinguished.

Although not illustrated, the vehicle brake device BA includes wheel cylinder pressure sensors that detect a hydraulic pressure of a hydraulic fluid (a wheel cylinder pressure) acting on each of the wheel cylinders 24FL, 24FR, 24RL, and 24RR.

The brake pedal 30 is operated by a driver of the vehicle. A brake pedal operation amount sensor 31 detects an amount of operation of the brake pedal 30 of the vehicle (a pedal stroke) and generates a signal indicating a brake pedal operation amount BP. The brake pedal operation amount sensor 31 is connected to the brake ECU 10.

The master cylinder 40 supplies (feeds) a hydraulic fluid (a brake fluid) to the brake actuator 50 in response to an operation of depressing the brake pedal 30. A pressure sensor 41 detects a hydraulic pressure of a hydraulic fluid in the master cylinder 40 (hereinafter referred to as a "master cylinder pressure") and generates a signal indicating a master cylinder pressure Pm. The pressure sensor 41 is connected to the brake ECU 10.

The brake actuator 50 includes a hydraulic circuit including a reservoir, a pump, and various valve units which are not illustrated. The brake actuator 50 is connected to the wheel cylinder 24 and supplies a hydraulic fluid to the wheel cylinder 24. The brake actuator 50 adjusts hydraulic pressures of the hydraulic fluids which are supplied to the wheel cylinders 24FL, 24FR, 24RL, and 24RR based on a command from the brake ECU 10.

The wheel cylinder 24 generates a frictional force acting on the corresponding wheel Wi by pressing the brake pad 23 against the brake disc 21 (hereinafter referred to as a "wheel frictional braking force") using the hydraulic pressure of the hydraulic fluid which is supplied from the brake actuator 50. Accordingly, each brake actuator 50 generates a frictional force (hereinafter referred to as a "braking force") between the corresponding wheel Wi and a ground contact surface.

The brake ECU 10 determines a target deceleration Gtg of the vehicle based on a value BKa which increases as the amount of operation of the brake pedal 30 increases (for example, a required braking operation amount such as the master cylinder pressure Pm and/or the brake pedal operation amount BP). For example, the brake ECU 10 calculates the target deceleration Gtg by applying the value BKa to a lookup table MapGtg (BKa). From the lookup table MapGtg (BKa), the target deceleration Gtg is acquired such that the magnitude thereof increases as the value BKa increases.

The brake ECU 10 calculates a braking force which needs to be generated in each wheel Wi (a required braking force) such that the vehicle decelerates at the target deceleration Gtg, and determines a target hydraulic pressure corresponding to the required braking force or a wheel frictional braking force which is determined based on the required braking force.

The brake ECU 10 gives an instruction to each brake actuator 50 and controls the brake actuator 50 such that the hydraulic pressure of the corresponding wheel cylinder 24 reaches the target hydraulic pressure. Accordingly, the brake ECU 10 controls the braking force.

In addition, according to necessity (for example, for the purpose of avoiding a collision), the brake ECU 10 gives an instruction to each brake actuator 50 and controls the hydraulic pressure of the corresponding wheel cylinder 24 regardless of an amount of depression of the brake pedal 30 by a driver.

The brake ECU 10 performs antilock brake control for releasing a locked state of each wheel (WFL, WFR, WRL, and WRR) at the time of braking the vehicle. Antilock brake control (simply referred to as "ABS control") is known and thus will be described below in brief.

Whenever a predetermined time elapses, the brake ECU 10 calculates the wheel speeds Vwi based on signals from the wheel speed sensors 11 and calculates slip ratios SPi of the wheels Wi based on the wheel speeds Vwi. A slip ratio SPi is a slip index value indicating a degree of slip of the corresponding wheel Wi and is calculated by Expression (1). "Va" denotes a reference speed and is, for example, a vehicle speed which is estimated from four wheel speeds Vwi. The vehicle speed may be a speed which is calculated from the highest wheel speed Vwi out of the four wheel speeds Vwi.

$$SPi=((Va-Vwi)/Va)\times 100\% \tag{1}$$

At the time of braking the vehicle, the brake ECU 10 determines whether an ABS control starting condition which will be described below is satisfied for each wheel Wi. When the ABS control starting condition is satisfied for one wheel Wi, the brake ECU 10 starts ABS control for the wheel Wi for which the ABS control starting condition is satisfied (hereinafter referred to as an "ABS object wheel Wi"). An ABS object wheel Wi can also be described as a wheel Wi which is in a locked state (with a locking tendency).

ABS Control Starting Condition

The ABS control starting condition is satisfied when both of two following conditions (Condition A1 and Condition A2) are satisfied.

(Condition A1) The slip ratio SPi is greater than a predetermined ABS start threshold value Thsta.

(Condition A2) The absolute value of the wheel acceleration DVi (a time differential value of the wheel speed Vwi) is greater than a predetermined wheel acceleration threshold value DVth.

ABS Control

The brake ECU 10 performs the following process as ABS control. That is, the brake ECU 10 controls the brake actuator 50 such that the wheel cylinder pressure (the braking pressure) of the wheel cylinder 24 corresponding to the ABS object wheel Wi decreases. Accordingly, the wheel frictional braking force acting on the ABS object wheel Wi decreases. As a result, the slip ratio SPi of the ABS object wheel Wi decreases slowly.

Thereafter, the brake ECU 10 repeatedly increases (or maintains) and decreases the wheel cylinder pressure of the wheel cylinder 24 corresponding to the ABS object wheel Wi. Then, the brake ECU 10 ends ABS control when a predetermined ABS control ending condition which will be described later is satisfied. That is, the brake ECU 10 matches the hydraulic pressure of the wheel cylinder 24 of the ABS object wheel Wi with the target hydraulic pressure.

ABS Ending Condition

The ABS control ending condition is satisfied, for example, when a state in which the slip ratios SPi of all the wheels Wi are less than an "ABS end threshold value Thend which is less than the ABS start threshold value Thsta" is maintained for a predetermined time or more.

Summary of Operation

First Determination

The brake ECU 10 determines whether both of Condition 1 and Condition 2 which will be described below are satisfied for each of four wheels Wi of the vehicle. In the following description, this determination is referred to as "first determination" and a process of performing first determination is referred to as a "first determination process." Condition 1 is also referred to as a "first condition" for the purpose of convenience. Condition 2 is also referred to as a "second condition" for the purpose of convenience.

Condition 1: Condition 1 is a condition which is satisfied at the time of strong braking (when a strong (large) braking request equal to or greater than a predetermined value is issued by a driver). Specifically, Condition 1 is satisfied when the target deceleration Gtg (the magnitude of the target deceleration Gtg) is equal to or greater than a predetermined deceleration threshold value Gtgth (which is a positive value of 1.6 G in this embodiment). The predetermined deceleration threshold value Gtgth is, for example, a value corresponding to a deceleration at which ABS control is supposed to be started on a normal road surface (a dry asphalt road surface) (Condition A1 is supposed to be satisfied). When Condition 1 is satisfied, the ECU 10 controls the brake actuator 50 such that a considerably great frictional braking force is generated in each wheel Wi. Condition 1 may be a condition which is satisfied when the value BKa which is the required brake operation amount is equal to or greater than a predetermined threshold value BKath.

Condition 2: Condition 2 is a condition which is satisfied when the slip ratio SPi is equal to or less than a predetermined slip ratio threshold value SPth. The predetermined slip ratio threshold value SPth may be, for example, the ABS start threshold value Thsta or may be a value less than the ABS start threshold value Thsta. The slip ratio threshold value SPth is also referred to as a "slip threshold value" for the purpose of convenience.

When Condition 1 is satisfied (that is, when the wheel frictional braking force of each wheel Wi is controlled to a considerably great value) and Condition 2 is satisfied for one wheel Wi, it can be considered that there is a likelihood that the slip ratio SPi of the wheel Wi will be equal to or less than the predetermined slip ratio threshold value SPth due to a decrease of the braking capacity of the frictional brake device 20 for the wheel Wi (brake performance). Examples of a reason for the decrease in brake performance of each frictional brake device 20 include a fade, a water fade, and a snow fade.

Accordingly, when Condition 1 is satisfied and Condition 2 is satisfied for one wheel Wi, the brake ECU 10 determines that "the wheel Wi is in a temporary braking decrease state." The temporary braking decrease state is a state in which there is a likelihood that brake performance of the frictional brake device 20 provided in the wheel Wi will decrease.

Second Determination

The brake ECU 10 determines whether there are (mixed) both a wheel Wi which is determined to be in the temporary braking decrease state through the first determination and a wheel Wi which is not determined to be in the temporary braking decrease state. That is, it is determined whether only some wheels Wi are determined to be in the temporary braking decrease state. In the following description, this determination is referred to as "second determination" and a process of performing second determination is referred to as a "second determination process." Hereinafter, three reasons for performing the second determination process will be separately described.

(1) There are (mixed) a wheel Wi which is determined to be in the temporary braking decrease state and a wheel Wi which is not determined to be in the temporary braking decrease state.

(2) There is no wheel Wi which is determined to be in the temporary braking decrease state.

(3) All (four) wheels Wi are determined to be in the temporary braking decrease state.

(1) Case in which there are (mixed) a wheel Wi which is determined to be in the temporary braking decrease state and a wheel Wi which is not determined to be in the temporary braking decrease state In this case, it can be considered that there is a high likelihood that brake performance of the frictional brake device 20 provided in the wheel Wi which is in the temporary braking decrease state will decrease. That is, since there is a wheel Wa which is not determined to be in the temporary braking decrease state (a wheel Wi in which the slip ratio SPi is equal to or greater than the predetermined slip ratio threshold value SPth), it can be determined that a wheel frictional braking force which is much greater than a road surface friction coefficient μ of a road surface on which the vehicle is traveling is acting on the wheel Wa. In this situation, when there is a wheel Wb which is determined to be in the temporary braking decrease state (a wheel Wi in which the slip ratio SPi is less than the predetermined slip ratio threshold value SPth), it can be considered that the wheel frictional braking force for the wheel Wb is actually less than the wheel frictional braking force for the wheel Wa. Therefore, in this case, the brake ECU 10 determines that the vehicle brake device BA is in a braking capacity decrease state (a state in which the braking capacity of the vehicle brake device BA has decreased).

(2) Case in which there is No Wheel Wi which is Determined to be in the Temporary Braking Decrease State In this case, the slip ratios SPi of all the wheels Wi are equal to or greater than the slip ratio threshold value SPth. At this time, when the vehicle is traveling on a "road with a relatively great road surface friction coefficient μ (a road other than a low μ road)," it is considered that the wheel frictional braking forces with a sufficient magnitude are acting on the wheels Wi. That is, in this case, the vehicle brake device BA is not in the braking capacity decrease state. On the other hand, when the vehicle is traveling on a low μ road, the frictional brake device 20 for a certain wheel Wa is in the braking capacity decrease state, and the frictional brake devices 20 for the other wheels Wb are not in the braking capacity decrease state, the case (1) occurs earlier than the case (2). Since there is a very low likelihood that all the frictional brake devices 20 for four wheels Wi will fall simultaneously into the braking capacity decrease state, the likelihood that the case (2) will occur without occurrence of the case (1) is considered to be very low.

(3) Case in which all (Four) Wheels Wi are Determined to be in the Temporary Braking Decrease State In this case, the slip ratios SPi of all the wheels Wi are less than the slip ratio threshold value SPth. However, since Condition 1 is satisfied, this case can occur only when all the frictional brake devices 20 for the four wheels Wi are in the braking capacity decrease state. On the other hand, since there is a very low likelihood that all the frictional brake devices 20 for the four wheels Wi will fall simultaneously into the braking capacity decrease state as described above, the likelihood that the case (3) will occur without occurrence of the case (1) is considered to be very low.

Then, the brake ECU 10 changes control of a braking force based on the determination result of the second determination process. For example, when the determination result indicates that the "vehicle brake device BA is in the braking capacity decrease state," the brake ECU 10 decreases the magnitude of the target deceleration Gtg which is calculated as described above. Alternatively, the brake ECU 10 transmits the determination result to another ECU which is not illustrated. For example, when the determination result transmitted from the brake ECU 10 indicates that the "vehicle brake device BA is in the braking capacity decrease state," the other ECU attracts a driver's attention by turning on an indicator.

Specific Operation

The CPU of the brake ECU 10 (hereinafter simply referred to as a "CPU") performs the routine illustrated in the flowchart of FIG. 2 whenever a predetermined time elapses. Accordingly, at a predetermined time, the CPU starts the routine from Step 200 in FIG. 2 and determines whether a value of a braking capacity decrease abnormality state flag Xf is "0" in Step 205. The braking capacity decrease abnormality state flag Xf is also simply referred to as an "abnormality flag Xf."

When the value of the abnormality flag Xf is "1," it means that the CPU determines that the "braking capacity decrease state" has occurred. On the other hand, when the value of the abnormality flag Xf is "0," it means that the CPU determines that the "braking capacity decrease state" has not occurred. The value of the abnormality flag Xf is set to "0" in an initial routine which is performed by the CPU when an ignition key switch (not illustrated) which is mounted in the vehicle has been switched from an off position to an on position. The abnormality flag Xf is set to a value of "1" in a flag reset routine (not illustrated) which is performed by the CPU and then is set to "0" when a state in which braking is not performed continues for a predetermined time or more thereafter.

When the value of the abnormality flag Xf is not "0," the CPU determines "No" in Step 205 and temporarily ends this routine in Step 295. On the other hand, when the value of the abnormality flag Xf is "0," the CPU determines "Yes" in Step 205 and determines whether the vehicle is being braked by determining whether the value BKa (for example, the master cylinder pressure Pm) is equal to or greater than a "predetermined braking determination value BKath greater than 0" in Step 210.

When the vehicle is not being braked, the CPU determines "No" in Step 210 and temporarily ends this routine in Step 295. On the other hand, when the vehicle is being braked, the CPU determines "Yes" in Step 210, sequentially performs the processes of Steps 215 and 220 which will be described next, and then performs the process of Step 225.

Step 215: The CPU performs the "first determination process."

Step 220: The CPU sets a value of a temporary braking decrease state flag Xg of each wheel Wi based on the determination result of the "first determination process." In the following description, the temporary braking decrease state flag Xg is also simply referred to as a "temporary flag Xg."

Specifically, the CPU sets the value of the temporary flag Xg of a wheel Wi which is determined to be in the temporary braking decrease state to "1" and sets the value of the temporary flag Xg of a wheel Wi which is not determined to be in the temporary braking decrease state to "0." All the values of the temporary flags Xg of the wheels Wi are set to "0" in the above-mentioned initial routine.

In Step 225, the CPU performs the second determination process by determining whether the number of wheels Wi in which the value of the temporary flag Xg is "1" is equal to or greater than 1 and equal to or less than 3. In other words, the CPU determines whether there are both a wheel Wi which is determined to be in the temporary braking decrease state and a wheel Wi which is not determined to be in the temporary braking decrease state (that is, a mixed state). When the number of wheels Wi in which the value of the temporary flag Xg is "1" is not equal to or greater than 1 and equal to or less than 3 (that is, when there is no wheel which is determined to be in the temporary braking decrease state or when all (four) wheels Wi are determined to be in the temporary braking decrease state), the CPU determines "No" in Step 225 and temporarily ends this routine in Step 295. In this case, the value of the abnormality flag Xf is maintained at "0."

On the other hand, when the number of wheels Wi in which the value of the temporary flag Xg is "1" is equal to or greater than 1 and equal to or less than 3, the CPU determines "Yes" in Step 225 and sequentially performs the processes of Steps 230 and 235 which will be described next. Thereafter, the CPU temporarily ends this routine in Step 295.

Step 230: The CPU sets the value of the abnormality flag Xf to "1."

Step 235: The CPU outputs the determination result indicating that it is determined that the vehicle brake device BA is in the braking capacity decrease state to the other ECU.

As described above, the first control device determines whether there is a likelihood that the braking performance will decrease for each of the frictional brake devices 20 provided in all (four) wheels Wi through the first determination process. The first control device determines whether there is a considerably high likelihood that the braking performance of the frictional brake device 20 will decrease through the second determination process. Then, the first control device determines that the vehicle brake device BA is in the braking capacity decrease state when it is determined through the second determination process that there is a considerably high likelihood that the braking performance of the frictional brake device 20 will decrease. Accordingly, the first control device can enhance accuracy for determining whether the braking capacity of the vehicle brake device BA has decreased.

Second Embodiment

A vehicle control device according to a second embodiment of the disclosure (hereinafter referred to as a "second control device") is different from the first control device only in that the first determination process is performed as will be described below.

The brake ECU 10 of the second control device determines whether both Condition 3 and Condition 4 are satisfied for each wheel Wi of the vehicle. When both Condition 3 and Condition 4 are satisfied for a certain wheel Wi, the brake ECU 10 determines that the wheel Wi is in a temporary braking decrease state. Condition 3 is also referred to as a "first condition" for the purpose of convenience. Condition 4 is also referred to as a "second condition" for the purpose of convenience.

Condition 3: Condition 3 is the same as Condition 1 in the first embodiment. That is, Condition 3 is a condition which is satisfied when the target deceleration Gtg is equal to or greater than a predetermined deceleration threshold value Gtgth (at the time of strong braking).

Condition 4: Condition 4 is a condition which is satisfied when the slip ratio SPi is equal to or less than a predetermined slip ratio threshold value SPth and ABS control is not being performed on the wheels Wi. In other words, Condition 4 is satisfied when the slip ratio SPi is equal to or less than the predetermined slip ratio threshold value SPth and the corresponding wheel Wi is not an ABS object wheel Wi.

When Condition 4 is satisfied for a certain wheel Wi, it means that a state in which the slip ratio SPi of the wheel Wi is less than the ABS start threshold value Thsta is maintained. Accordingly, it can be thought that there is a likelihood that the braking capacity of the frictional brake device 20 for the wheel Wi has decreased.

Accordingly, when both Condition 3 and Condition 4 are satisfied for a certain wheel Wi, the brake ECU 10 determines that the "wheel Wi is in the temporary braking decrease state."

Specific Operation

Figure 2:
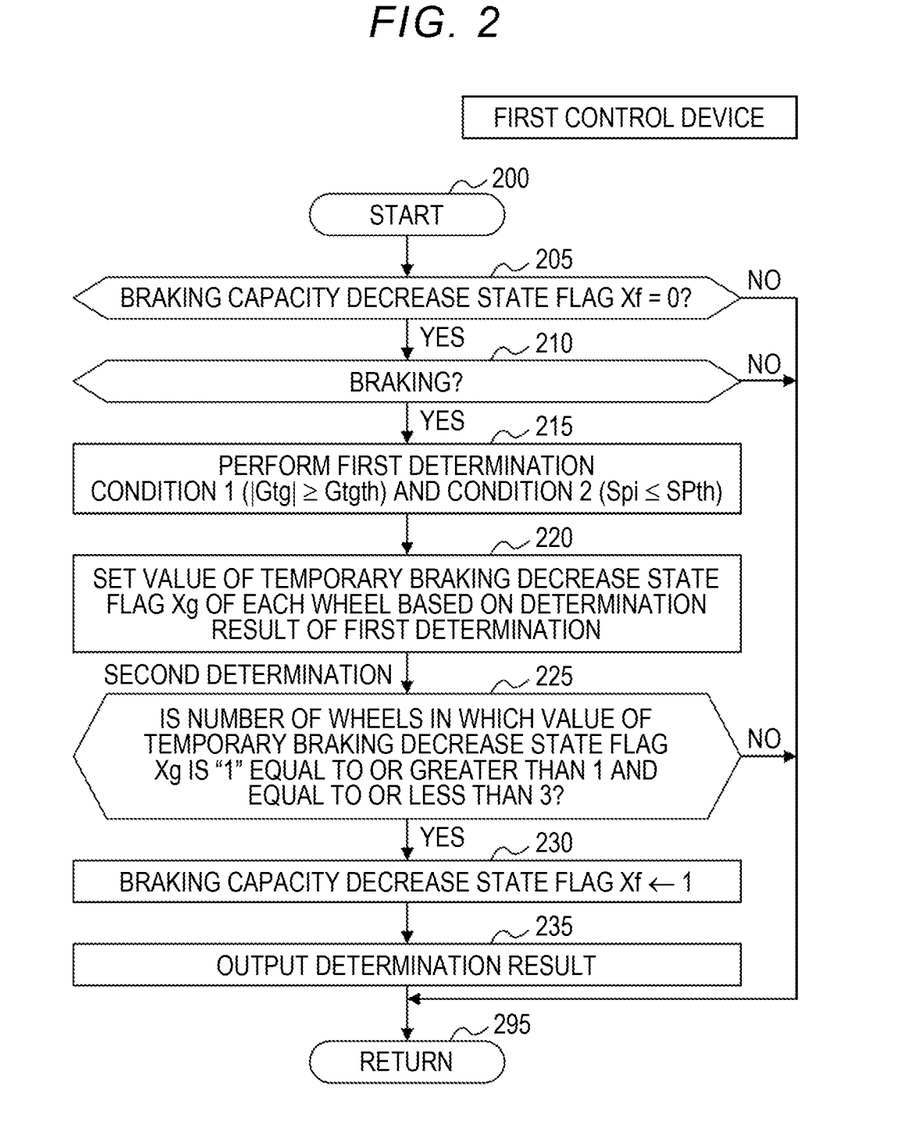
FIG. 2 is a flowchart illustrating a routine which is performed by a CPU of a brake ECU of the first control device.
Figure 3:
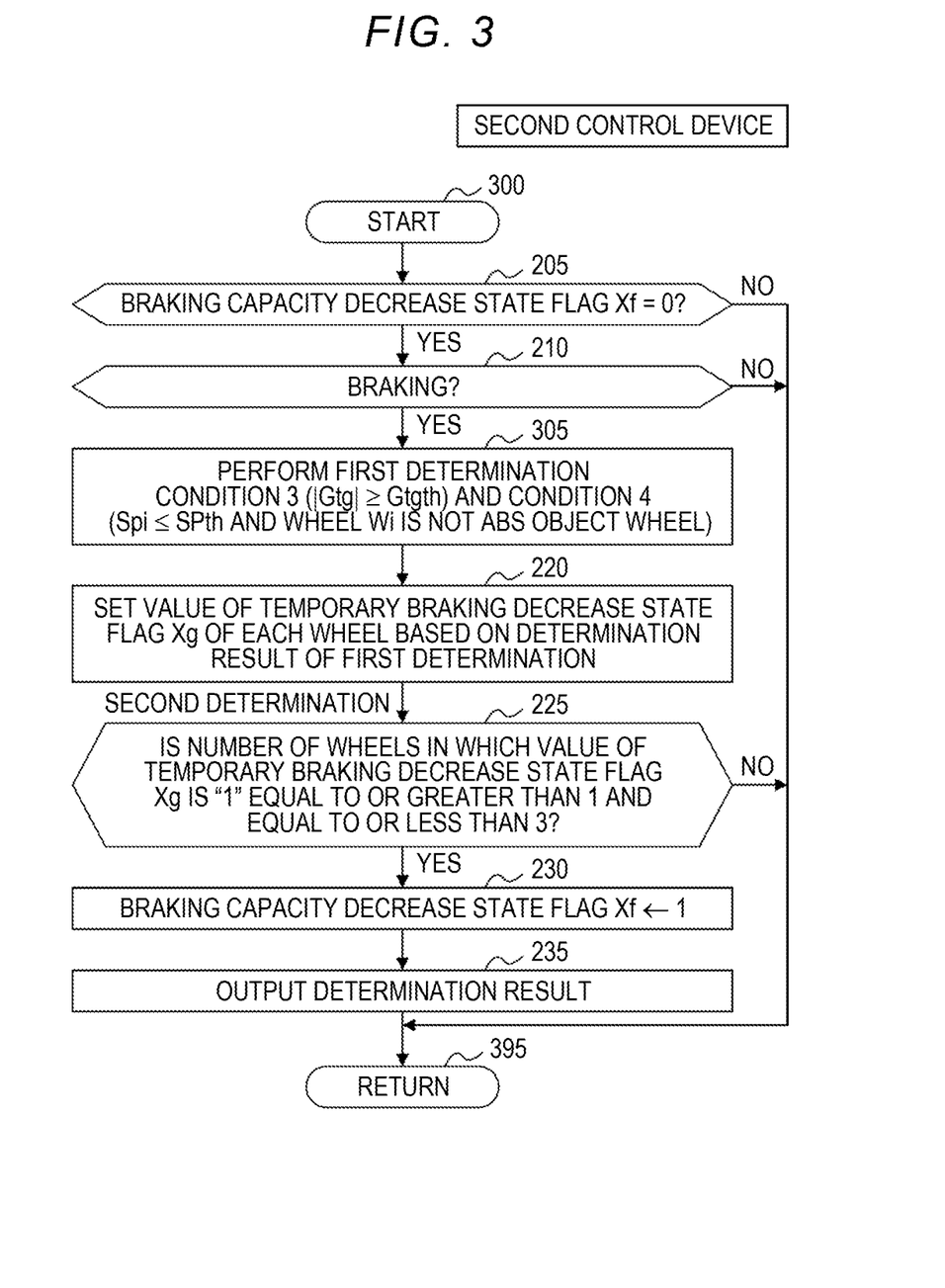
FIG. 3 is a flowchart illustrating a routine which is performed by a CPU of a brake ECU of a vehicle control device according to a second embodiment of the disclosure.

The CPU of the second control device performs a routine illustrated in the flowchart of FIG. 3 instead of the routine illustrated in FIG. 2. The routine in FIG. 3 is different from the routine in FIG. 2 only in that Step 215 of the routine in FIG. 2 is replaced with Step 305. Accordingly, this different step will be mainly described below.

In Step 305, the CPU performs a first determination process in the second embodiment. That is, the CPU determines whether both Condition 3 and Condition 4 are satisfied for each wheel Wi of the vehicle.

As described above, similarly to the first control device, the second control device can improve accuracy for determining whether the braking capacity of the vehicle brake device BA has decreased.

Third Embodiment

A vehicle control device according to a third embodiment of the disclosure (hereinafter referred to as a "third control device") is different from the first control device, only in that the first determination process is performed as will be described below.

As the first determination process, the brake ECU 10 of the third control device determines whether all of "Condition 5, Condition 6, and Condition 7" are satisfied for each wheel Wi of the vehicle. When all of Condition 5, Condition 6, and Condition 7 are satisfied for a certain wheel Wi, the brake ECU 10 determines that the wheel Wi is in a temporary braking decrease state. Condition 5 is also referred to as a "first condition" for the purpose of convenience. Condition 6 is also referred to as a "second condition" for the purpose of convenience. Condition 7 is also referred to as a "third condition" for the purpose of convenience.

Condition 5: Condition 5 is the same as Condition 1 in the first control device (target deceleration Gtg≥deceleration threshold value Gtgth).

Condition 6: Condition 6 is the same as Condition 4 in the second control device (slip ratio SPi≤slip ratio threshold value SPth and a wheel Wi is not an ABS object wheel Wi).

Condition 7: Condition 7 is a condition which is satisfied when an estimated road surface friction coefficient μ0 which is calculated for each wheel Wi by the brake ECU 10 is a predetermined upper limit value Max which will be described later.

For the purpose of easy understanding of Condition 7, a method of calculating the estimated road surface friction coefficient μ0 which is performed by the brake ECU 10 will be first described below.

Method of Calculating Estimated Road Surface Friction Coefficient

When the vehicle brake device BA brakes the vehicle, the brake ECU 10 calculates a first estimated value μ1 and a second estimated value μ2 as an estimated value of a road surface friction coefficient μ of a traveling road on which the vehicle is traveling using a method which will be described below whenever a predetermined time elapses.

The brake ECU 10 acquires the first estimated value μ1 as follows. The brake ECU 10 considers that a certain wheel Wi tends to enter a locked state at a specific time point at which the wheel Wi is determined to be an ABS object wheel and decrease of the wheel cylinder pressure of the ABS object wheel is started (a time point at which ABS control is started for the wheel Wi). At a time point immediately before the specific time point, it is thought that the wheel Wi generates a maximum braking force which changes with the road surface friction coefficient μ. At a time point immediately before the specific time point, a braking force Bi and the road surface friction coefficient μ satisfy Bi=μ·mL·g (mL: a wheel load of the wheel Wi, g: gravitational acceleration).

Figure 4A:
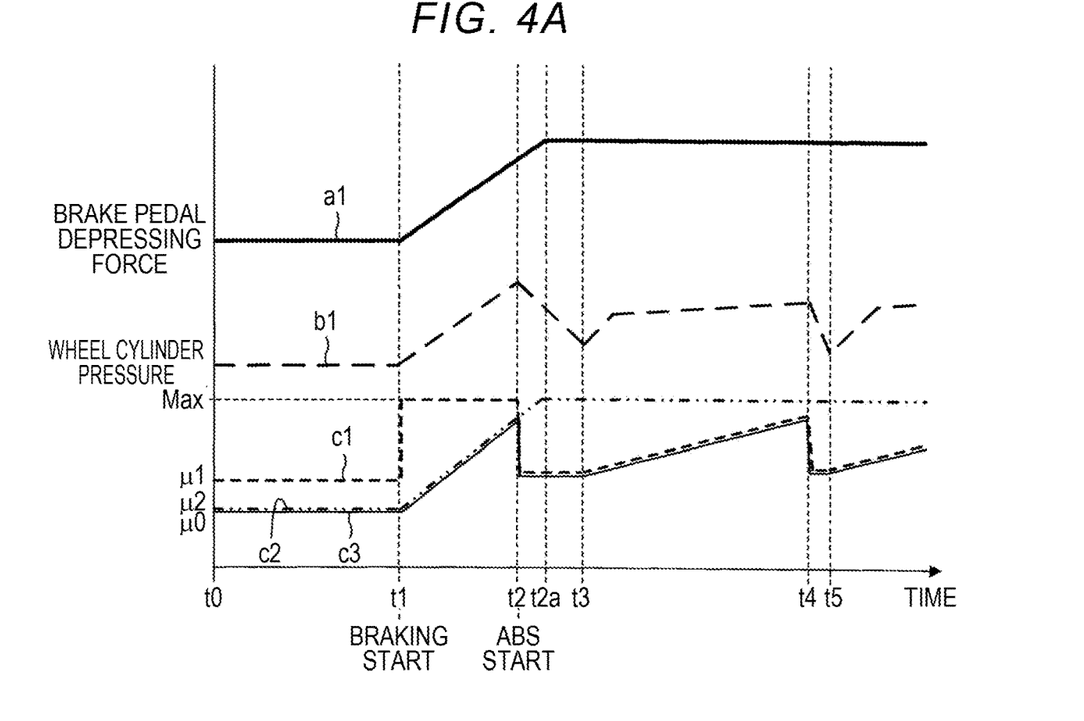
FIG. 4A is a timing chart illustrating a method of estimating a road surface friction coefficient $\mu$.

Therefore, the brake ECU 10 calculates the first estimated value μ1 based on μ1=Bi/(mL·g) at a time point immediately before the specific time point (see a value immediately after time t2 on a dotted line c1 in FIG. 4A). The braking force Bi can be calculated from the wheel cylinder pressure of the wheel Wi at a time point immediately before the specific time point. The brake ECU 10 maintains the calculated first estimated value μ1 (keeps the first estimated value μ1 constant) while the wheel cylinder pressure is decreasing.

At a time point before the specific time point at which the wheel Wi is determined to be an ABS object wheel, since the road surface friction coefficient μ is not reflected in the braking force, the first estimated value μ1 cannot be calculated. Therefore, the brake ECU 10 sets the first estimated value μ1 to a predetermined upper limit value Max such that the first estimated value μ1 is not employed as the final estimated road surface friction coefficient μ0 at a time point after start of braking and before the specific time point (see values from time t1 to time t2 on the dotted line c1 in FIG. 4A). The upper limit value Max is a value of the road surface friction coefficient μ which is not actually possible or a value which is slightly greater than a maximum value of the road surface friction coefficient μ which is actually possible, and is set in advance. The brake ECU 10 may set a value which is acquired based on the target deceleration Gtg (for example, Gtg/g) as the upper limit value Max. In this case, the upper limit value Max at the time of strong braking may be a value of the road surface friction coefficient μ which is not actually possible or a value which is slightly greater than a maximum value of the road surface friction coefficient μ which is actually possible.

The wheel cylinder pressure decreases continuously after a time point at which ABS control for a wheel Wi has been started, and thus the brake ECU 10 slowly increases the wheel cylinder pressure for the wheel Wi when the slip ratio SPi decreases to a predetermined pressure increase start threshold value. As a result, the slip ratio SPi of the wheel Wi increases gradually (see a dotted line b1 from time t3 to time t4 in FIG. 4A). Accordingly, when the slip ratio SPi becomes greater than a predetermined pressure decrease threshold value, the wheel cylinder pressure decreases again (see the dotted line b1 from time t4 to time t5 in FIG. 4A). In this case, the brake ECU 10 calculates the first estimated value μ1 again based on the braking force Bia of the wheel Wi and the wheel load mL immediately before the wheel cylinder pressure starts decreasing (μ1=Bia/(mL·g), see a value immediately after time t4 on the dotted line c1 in FIG. 4A).

While the wheel cylinder pressure of the wheel Wi is increasing (or maintained) by ABS control for the wheel Wi, the brake ECU 10 calculates a value obtained by increasing the first estimated value μ1 at a time point at which increase of the wheel cylinder pressure is started at a first rate of increase as the first estimated value μ1 (see values from time t3 to time t4 on the dotted line c1 in FIG. 4A).

The brake ECU 10 acquires the second estimated value μ2 as follows. That is, it can be thought that the road surface friction coefficient μ increases in proportion to an increase of the braking force until the slip ratio SPi reaches a value corresponding to a peak value of the road surface friction coefficient μ after braking has been started. Based on this thought, the brake ECU 10 acquires a value which increases at a constant second rate of increase from an initial value (for example, "0") less than the upper limit value Max (a value which increases by a predetermined value whenever a predetermined time elapses) as the second estimated value μ2 (see values from time t1 to time t2a on an alternate long and two short dashes line c2 in FIG. 4A). After a time point at which the second estimated value μ2 reaches the upper limit value Max, the brake ECU 10 sets the second estimated value μ2 to the upper limit value Max (see a value after time t2a on the alternate long and two short dashes line c2 in FIG. 4A).

The brake ECU 10 employs the lesser value of the acquired first estimated value μ1 and the acquired second estimated value μ2 as the estimated road surface friction coefficient μ0 whenever a predetermined time elapses. With this method of calculating the estimated road surface friction coefficient μ0, since the first estimated value μ1 matches the upper limit value Max before ABS control for the wheel Wi is started from start of braking, the second estimated value μ2 which is less than the upper limit value Max is employed as the estimated road surface friction coefficient μ0 (see values from time t1 to time t2 on a solid line c3 in FIG. 4A). After the time point at which ABS control for the wheel Wi has been started, the first estimated value μ1 is employed as the estimated road surface friction coefficient μ0 (see values after time t2 on the solid line c3 in FIG. 4A).

Case in which Brake Capacity Decrease State of Frictional Brake Device 20 does not Occur In FIG. 4A, it is assumed that a state in which the braking capacity of the frictional brake device 20 decreases does not occur when strong braking has been started at time t1. Line a1 denotes a depression force of the brake pedal 30, Line b1 denotes a wheel cylinder pressure of a wheel Wi (the front-right wheel WFR in this example), Line c1 denotes a first estimated value μ1, Line c2 denotes a second estimated value μ2, and Line c3 denotes an estimated road surface friction coefficient μ0. This example is the same as described above.

Figure 4B:
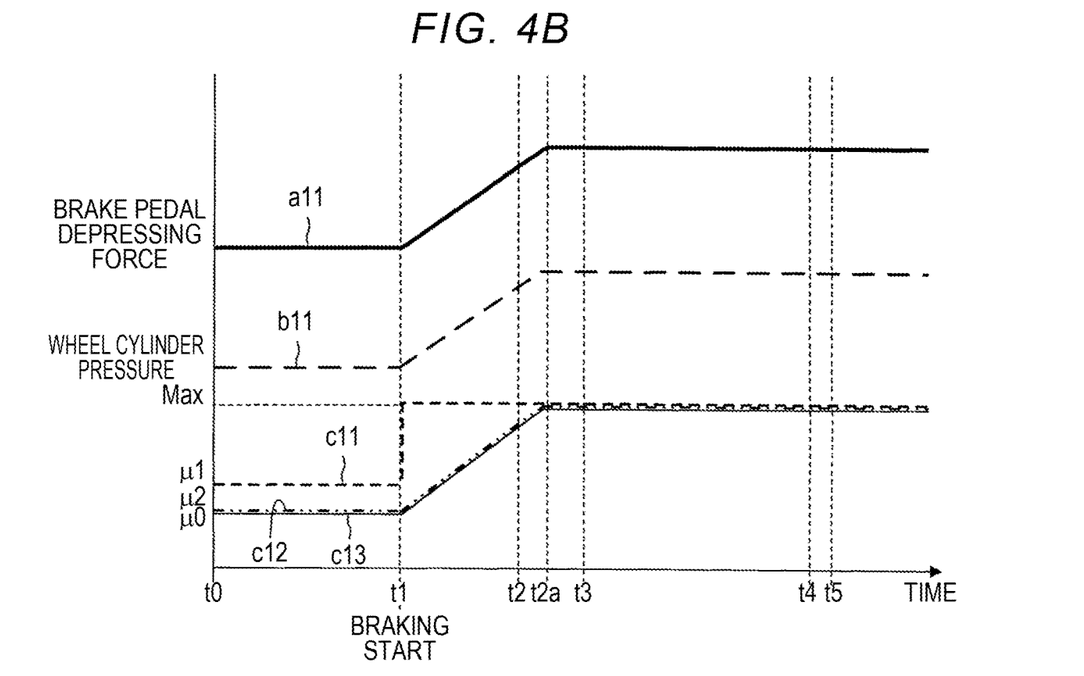
FIG. 4B is a timing chart illustrating a method of estimating a road surface friction coefficient $\mu$.

Case in which Brake Capacity Decrease State of Frictional Brake Device 20 Occurs In FIG. 4B, it is assumed that a state in which the braking capacity of the frictional brake device 20 decreases occurs in a wheel Wi when strong braking has been started at time t1. Line a11 denotes a depression force of the brake pedal 30, Line b11 denotes a wheel cylinder pressure of a wheel Wi, Line c11 denotes a first estimated value μ1, Line c12 denotes a second estimated value μ2, and Line c13 denotes an estimated road surface friction coefficient μ0.

When the braking capacity of the frictional brake device 20 for a wheel Wi decreases, the wheel speed Vwi is less likely to decrease and thus the slip ratio SPi is less likely to increase in comparison with a case in which the braking capacity of the frictional brake device 20 does not decrease. Accordingly, a state in which the wheel Wi is not an ABS object wheel and the ABS control start condition for the wheel Wi is not satisfied is maintained (see values after time t2 in FIG. 4B with respect to time t2 in FIG. 4A).

Accordingly, as illustrated in FIG. 4B, a decrease of a hydraulic pressure of the wheel cylinder 24 due to ABS control is not started even after time t2. Accordingly, at time t2a, the second estimated value μ2 reaches the upper limit value Max and both the first estimated value μ1 and the second estimated value μ2 are set to the upper limit value Max. As a result, after time t2a, the brake ECU 10 employs the upper limit value Max as the estimated road surface friction coefficient μ0 (see the solid line c13).

In this way, when the state in which the braking capacity of the frictional brake device 20 decreases occurs and a certain time elapses from start of braking, the estimated road surface friction coefficient μ0 is maintained at the upper limit value Max.

As described above, when an estimated road surface friction coefficient μ0 which is estimated for a certain wheel Wi reaches the upper limit value Max, it can be thought that ABS control for the wheel Wi is not performed for a long period of time (that is, there is a likelihood that the braking capacity of the frictional brake device 20 of the wheel Wi will decrease and the slip ratio SPi will not increase). Accordingly, the third control device sets the condition that the estimated road surface friction coefficient μ0 reaches the upper limit value Max as one determination condition in the first determination process. The third control device can further improve accuracy for determining whether the braking capacity of the vehicle brake device BA has decreased by setting Condition 7 in addition to Condition 5 and Condition 6.

Specific Operation

Figure 5:
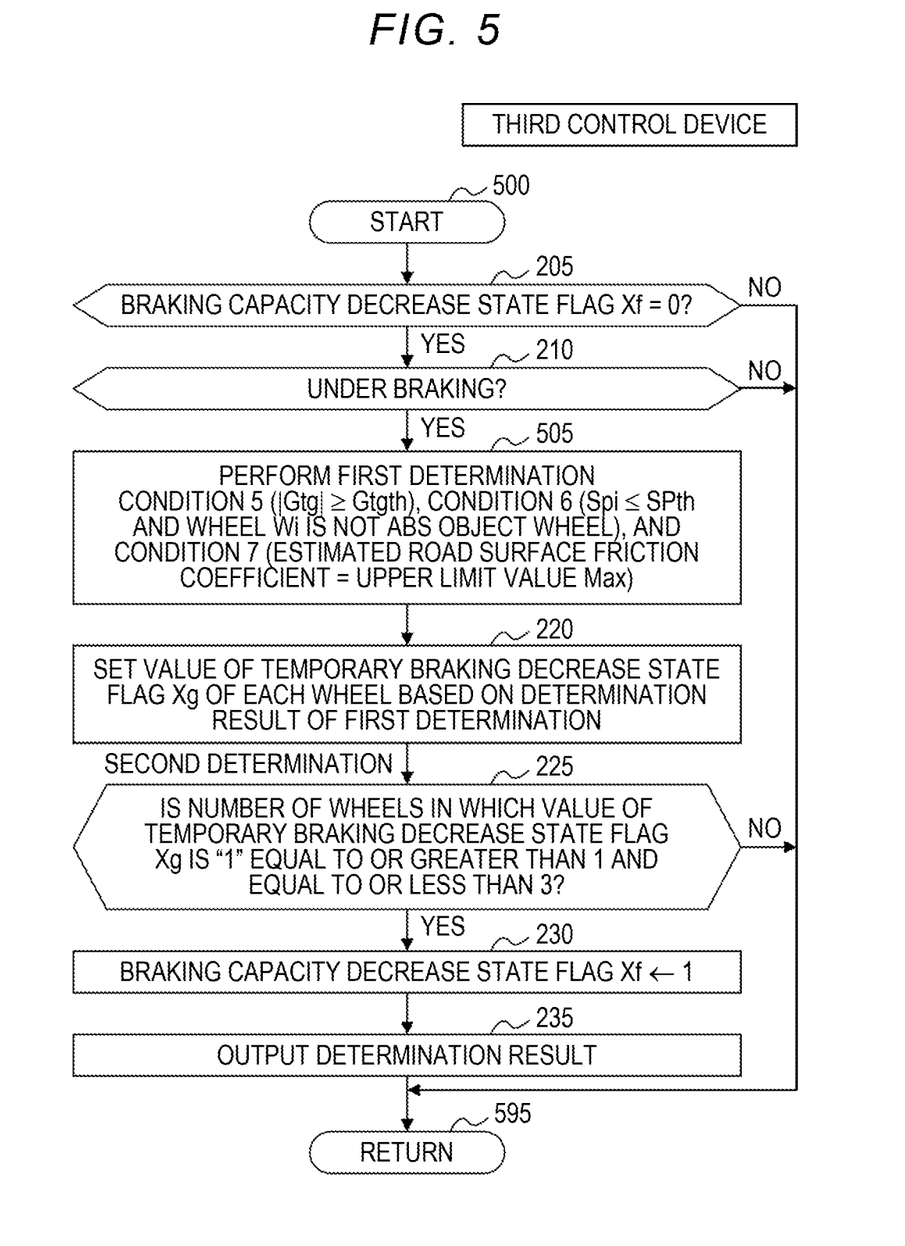
FIG. 5 is a flowchart illustrating a routine which is performed by a CPU of a brake ECU of a vehicle control device according to a third embodiment of the disclosure.

The CPU of the third control device performs a routine illustrated in the flowchart of FIG. 5 instead of the routine illustrated in FIG. 2. The routine in FIG. 5 is different from the routine in FIG. 2 only in that Step 215 of the routine in FIG. 2 is replaced with Step 505. Accordingly, this different step will be mainly described below.

In Step 505, the CPU performs the first determination in the third embodiment. That is, the CPU determines whether all of Condition 5, Condition 6, and Condition 7 are satisfied for each wheel Wi of the vehicle.

As described above, the third control device can further improve accuracy for determining whether the braking capacity of the vehicle brake device BA has decreased.

The disclosure is not limited to the above embodiments and can employ various modifications within the scope of the disclosure.

For example, as the determination conditions of the first determination process in the first control device, Condition 7 and/or Condition 8 may be added to Condition 1 and Condition 2. Condition 8 is also referred to as a "fourth condition" for the purpose of convenience.

Condition 8: Condition 8 is a condition which is satisfied when an estimated temperature of the brake pad 23 is equal to or greater than a predetermined threshold value. The temperature of the brake pad 23 can be estimated using any known method.

In brief, the estimated temperature of the brake pad 23 is acquired, for example, as follows.

The brake ECU 10 calculates a basic amount of heat emitted from the brake pad 23 of each wheel Wi for each wheel Wi based on the vehicle speed and the wheel cylinder pressures of the wheels Wi (by applying these values to a predetermined lookup table). The brake ECU 10 corrects a basic amount of radiated heat, which is calculated based on a difference between the temperature of the brake pad 23 (the temperature of the brake pad 23 which was calculated a predetermined time before) and an outside air temperature which is separately detected, using a heat radiation coefficient and calculates the corrected value as an amount of heat radiated from the brake pad 23. The heat radiation coefficient is determined based on a rainfall intensity which is determined from an operating state of a wiper and a signal from a rain sensor or the like, the vehicle speed, and the like. The brake ECU 10 updates the temperature of the brake pad 23 based on the basic amount of radiated heat, the slip ratio SPi, the amount of radiated heat, and the mass and specific heat of the brake pad 23 (for example, see Japanese Unexamined Patent Application Publication No. 2007-182180 (JP 2007-182180 A)).

Alternatively, the brake ECU 10 estimates a brake frictional force which is generated between the brake disc 21 and the brake pad 23 of each wheel Wi based on the wheel cylinder pressure and calculates an amount of work based on the estimated brake frictional force and an amount of rotation per unit time of the brake disc 21. The brake ECU 10 estimates the temperature of the brake pad 23 based on the amount of work and a cooling model of the brake pad 23 (for example, see Japanese Unexamined Patent Application Publication No. 2009-190475 (JP 2009-190475 A)).

As the determination conditions of the second determination process in the second control device, Condition 8 may be added to Condition 3 and Condition 4. As the determination conditions of the second determination process in the third control device, Condition 8 may be added to Condition 5, Condition 6, and Condition 7.

As the determination conditions of the first determination process in the first control device, Condition 2 may be replaced with Condition 9 which will be described below. Similarly, as the determination conditions of the first determination process in the third control device, Condition 6 may be replaced with Condition 9 which will be described below.

Condition 9: Condition 9 is a condition which is satisfied when an amount of slip Smi is equal to or less than a predetermined slip threshold value Smith.

The amount of slip Smi is a slip index value indicating a degree of slip of a wheel Wi and is calculated by Expression (2). "Va" denotes the above-mentioned reference speed and is, for example, a vehicle speed which is estimated from four wheel speeds Vwi.

$$Smi = (Va - Vwi) \quad (2)$$

As the determination conditions of the first determination process in the second control device, Condition 4 may be replaced with Condition 10 which will be described below. Similarly, as the determination conditions of the first determination process in the third control device, Condition 6 may be replaced with Condition 10 which will be described below.

Condition 10: Condition 10 is a condition which is satisfied when an amount of slip Smi is equal to or less than a predetermined slip threshold value Smith and the corresponding wheel Wi is not an ABS object wheel Wi.

In the first determination process, the above-mentioned control devices may determine that the first determination condition is satisfied when a period of time in which the first determination condition is continuously satisfied becomes equal to or greater than a predetermined time threshold value.

What is claimed is:

1. A braking capacity decrease determining device comprising:
    wheel speed sensors configured to generate signals corresponding to wheel speeds of a plurality of wheels provided on a vehicle;
    a brake device including frictional brake devices that are provided in the plurality of wheels and that are able to adjust a frictional braking force which is applied to the corresponding wheel; and
    a control unit configured to control the frictional braking forces which are applied to the plurality of wheels,
    wherein the control unit is configured to
        perform a first determination process of determining whether a temporary braking decrease determination condition is satisfied for each of the plurality of wheels, the temporary braking decrease determination condition being satisfied when a first condition which is satisfied at the time of strong braking in which a magnitude of a required deceleration for the vehicle is equal to or greater than a predetermined deceleration threshold value and a second condition which is satisfied when a slip index value indicating a degree of slip of each wheel which is calculated based on the wheel speeds of the plurality of wheels is equal to or less than a predetermined slip threshold value are satisfied, and
        perform a second determination process of determining whether there are both a first wheel out of the plurality of wheels for which the temporary braking decrease determination condition is satisfied and a second wheel out of the plurality of wheels for which the temporary braking decrease determination condition is not satisfied and determining that a braking capacity of the brake device has decreased when it is determined that there are both the first wheel for which the temporary braking decrease determination condition is satisfied and the second wheel for which the temporary braking decrease determination condition is not satisfied.

2. The braking capacity decrease determining device according to claim 1, wherein the control unit is configured to start antilock brake control for decreasing the frictional brake force which is applied to an ABS object wheel which is a wheel in which the slip index value is greater than a predetermined antilock control start threshold value when there is the ABS object wheel, and
    wherein the control unit is configured to determine that the second condition is satisfied when a condition which is satisfied when the corresponding wheel is not the ABS object wheel is further satisfied in the first determination process.

3. The braking capacity decrease determining device according to claim 2, wherein, when the brake device brakes the vehicle, the control unit is configured to calculate a first estimated value of a road surface friction coefficient of a road surface on which the vehicle is traveling and a second estimated value of the road surface friction coefficient of the road surface for each of the plurality of wheels and to determine the lesser value of the first estimated value and the second estimated value as an estimated road surface friction coefficient which is a final estimated value of the road surface friction coefficient of the road surface,
    wherein the control unit is configured to slowly increase the frictional braking force of the ABS object wheel after decreasing the frictional braking force of the ABS object wheel by a predetermined amount in the antilock brake control,
    wherein the control unit is configured to calculate the first estimated value for each wheel through a process of:
        setting the first estimated value for each wheel to a predetermined upper limit value from a time point at which the brake device starts braking the vehicle to a time point at which the antilock brake control is started;
        calculating the first estimated value for each wheel based on a braking force which is generated by each wheel against the road surface at a time point immediately before a time point at which the frictional braking force has decreased when the frictional braking force for each wheel decreases by the antilock brake control;

increasing the first estimated value for each wheel at a first rate of increase which is constant while the frictional braking force of each wheel is increasing by the antilock brake control; and setting the first estimated value for each wheel to the upper limit value when the first estimated value for each wheel is greater than the upper limit value, wherein the control unit is configured to calculate the second estimated value for each wheel through a process of:

calculating a value increasing at a second rate of increase which is constant from a predetermined initial value which is a value less than the upper limit value as the second estimated value for each wheel after a time point at which braking the vehicle has been started; and setting the second estimated value for each wheel to the upper limit value when the second estimated value for each wheel is greater than the upper limit value, and wherein, in the first determination process, the control unit is configured to determine whether a third condition which is satisfied when the determined estimated road surface frictional coefficient matches the upper limit value is satisfied and to determine that the temporary braking decrease determination condition for the wheel for which the first condition, the second condition, and the third condition are all satisfied is satisfied when the first condition, the second condition, and the third condition are all satisfied.

4. The braking capacity decrease determining device according to claim 1, wherein the control unit is configured to estimate a temperature of a member constituting the frictional brake device provided in each of the plurality of wheels, and wherein, in the first determination process, the control unit is configured to determine whether a fourth condition which is satisfied when the estimated temperature of the member constituting the frictional brake device provided in each wheel is equal to or greater than a predetermined temperature threshold value is satisfied and to determine that the temporary braking decrease determination condition for the wheel for which the first condition, the second condition, and the fourth condition are all satisfied is satisfied when the first condition, the second condition, and the fourth condition are all satisfied.

* * * * *